United States Patent [19]
Hemp et al.

[11] Patent Number: 5,389,260
[45] Date of Patent: Feb. 14, 1995

[54] BRINE SEAL FOR TUBULAR FILTER

[75] Inventors: Melvin R. Hemp, Lodi; Daniel A. Klein, Middleton, both of Wis.

[73] Assignee: Clack Corporation, Windsor, Wis.

[21] Appl. No.: 41,542

[22] Filed: Apr. 2, 1993

[51] Int. Cl.$^6$ ............................................. B01D 61/08
[52] U.S. Cl. .................. 210/652; 210/321.83; 210/450
[58] Field of Search .............. 210/321.83, 450, 321.6, 210/652

[56] References Cited

U.S. PATENT DOCUMENTS

| | | | |
|---|---|---|---|
| 3,542,204 | 11/1970 | Clark | 210/450 X |
| 4,208,289 | 6/1980 | Bray | 210/450 X |
| 4,911,840 | 3/1990 | Underwood | 210/321.83 |
| 5,002,664 | 3/1991 | Clack et al. | 210/251 |

OTHER PUBLICATIONS

Advertisement entitled "SMARTTAP: Reverse Osmosis Drinking Water Systems With Intelligence You Can See" by Hydrotechnology Inc., from Water Conditioning & Purification, Mar. 1993.
Advertisement entitled "Smarter Than Ever" by Hydrotechology, Inc., from Water Conditioning & Purification, Mar. 1993.

*Primary Examiner*—Frank Spear
*Attorney, Agent, or Firm*—Nilles & Nilles

[57] ABSTRACT

A filter assembly is provided for a manifolded water filtration system and includes a filter element, a brine seal located at the top of the filter element and engaging a boss depending from the system manifold. The brine seal isolates a rinse water discharge port, communicating with a an outlet of the filter element, from an untreated water inlet port formed in the boss so as to ensure that the water to be treated passes through the filter membrane as opposed to directly out of the rinse water discharge port. This configuration eliminates the need for an exterior feed line, thus simplifying the system and preventing vibration during system start-up. The brine seal also structurally reenforces the filter element, facilitates assembly of the filter, increases the capacity of the assembly, and reduces the chances of failure and leakage.

20 Claims, 8 Drawing Sheets

BRINE SEAL FOR TUBULAR FILTER

BACKGROUND OF THE INVENTION

1. Field of the Invention

The invention relates to brine seals for filter assemblies and, more particularly, relates to brine seals for tubular filter assemblies connectable to a filter manifold and to filter assemblies incorporating such brine seals.

2. Discussion of the Related Art

Tubular filter assemblies are widely used in drinking water filtration systems and the like. Two or more such assemblies are typically connected to a single manifold with each filter providing a different type of treatment. At least one filter of such systems typically comprises a so-called reverse-osmosis filter assembly having a tubular, typically rolled filter element connected to a manifold having an untreated water inlet port, a treated water outlet or discharge port, and a brine or rinse water outlet or discharge port.

One such water filter assembly is disclosed in U.S. Pat. No. 5,002,664 which issued on Mar. 26, 1991 in the name of Robert A. Clack et al. ("the Clack patent"), the subject matter of which is hereby incorporated by reference. Referring now to FIG. 1, a water filtration system 10 of the type disclosed in the Clack patent includes a manifold 12 and a reverse-osmosis filter assembly 14. Filter assembly 14 includes a tubular filter element 16 formed from a rolled filter membrane and encased in a sump or housing 18 connected to a boss 20 of the manifold 12 by a sump nut 22. Untreated water is fed from the manifold 12 into an inlet 24 formed in the bottom of housing 18 via an external feed line 26. Water is treated in filter assembly 14 in a manner which is, per se, well known, with treated water returning to the manifold 12 via a male fitting 28 extending from filter element 16 and cooperating with a corresponding female fitting 30 depending from manifold 12. Rinse water returns to the manifold 12 by flowing through a passage 32 formed between the boss 20 and the fittings 28 and 30.

A brine seal 34 is provided proximate the lower end 36 of tubular filter element 16 so as to assure that water flows into the lower axial end 38 of filter element 16 rather than directly into the rinse water passage 32. Brine seal 34 includes a body 40 and a skirt 42 which sealingly engages the inner peripheral surface of housing 18.

The filter assembly 14 of FIG. 1 incorporating the brine seal 34, while providing adequate water treatment, exhibits several disadvantages. For instance, feed line 26 is not only aesthetically unattractive, but may also be subject to puncture and breakage, and also requires the use of relatively complex fittings connecting the feed line 26 to bottom inlet 24 of housing 18. This inlet 24 and the associate fittings 44 may be subject to leakage problems when the housing 18 is pressurized during operation of the water filtration system. Moreover, it has been found that, due to the relationship between the water feed passageway including an internal shutoff valve and the external feed line 26, harmonics may arise in the system upon start-up which create bothersome vibrations and noises.

In addition, the location of the brine seal 34 on the lower end 36 of filter element 16 may hamper assembly of the filter assembly 14. That is, unless care is taken when inserting the housing 18 over the brine seal 34 on the filter element 16, the skirt 42 of brine seal 34 may bend upwardly, thus destroying the effectiveness of the seal and rendering the filter assembly 14 inoperable for its intended purpose.

Providing a brine seal 34 on the lower end of the filter element 16 also decreases the capacity of filter assembly 14 if an injection molded housing 18 is employed. Injection molded elements are necessarily tapered from their upper to their lower ends. It is therefore necessary to decrease the diameter and thus the capacity of the filter element 16 to assure adequate clarence between the filter element and the housing in the vicinity of the brine seal 34.

Moreover, water pressure between the skirt and the filter element tends to force the brine seal away from the element, thus threatening the integrity of the seal, particularly if the seal is secured to the filter element by taping.

Still another disadvantage resides in the fact that brine seal 34 is also incapable of reenforcing the upper axial end of the filter element 16, thus requiring the employment of an additional reenforcement device to prevent the rolled filter membrane from telescoping during use.

Other known filtration systems eliminate the feed line by employing a specially designed filter element in which the untreated water inlet, rinse water outlet, and treated water outlet are all formed in the upper axial end of the filter element with the waste or rinse water and treated water being discharged from concentric tubes. This arrangement is complex and thus relatively expensive to fabricate.

OBJECTS AND SUMMARY OF THE INVENTION

It is therefore an object of the invention to provide a filter assembly which is simple in construction, which can accommodate a conventional filter element, which is easy to assemble, and which does not vibrate upon start-up.

Another object of the invention is to provide a brine seal for a filter assembly which is simple in construction and operation while at the same time reenforcing the filter element of the assembly.

In accordance with one aspect of the invention, these and other objects are achieved by providing a brine seal having a tubular body for surrounding the upper axial end of the tubular filter element. The body has inner and outer peripheral surfaces and upper and lower portions, and a seal, extending outwardly from the outer peripheral surface of the body, for isolating an untreated water inlet of the filter assembly from the water outlet. Preferably, the seal further includes a ring, disposed within the body proximate a junction between the upper and lower portions, for engaging the fitting of the filter element proximate the axial surface, and a support, extending generally radially from the ring to the inner peripheral surface of the body, for reenforcing the axial surface.

Preferably, the support is formed from a plurality of ribs extending radially from the inner peripheral surface of the body to the ring and each having bottom surfaces which are generally coplanar with a bottom surface of the ring. The seal preferably comprises an annular skirt formed from a flexible material and angled downwardly with respect to the outer peripheral surface of the body.

Still another object of the invention is to provide a water filtration system employing an improved filter assembly.

In accordance with another aspect of the invention, this object is achieved by providing a liquid filtration system comprising a manifold having a water discharge port formed therein and a tubular support extending downwardly from the manifold. The support has an internal passage formed therein through which untreated water flows and which terminates in an untreated water inlet port. Also provided are a tubular filter element having an outlet communicating with the discharge port and an inlet communicating with the inlet port, and a brine seal which isolates the inlet port from the discharge port. The brine seal preferably includes a tubular body having an inner peripheral surface which surrounds the filter element and which has an outer peripheral surface, and a skirt which extends outwardly from the outer peripheral surface of the body and which sealingly engages the support above the inlet port.

Preferably, the support comprises an annular boss having outer peripheral threads.

In order to reinforce the filter element, the brine seal preferably has 1) a ring which engages the discharge fitting of the filter element, and 2) a plurality of ribs which extend radially from the ring to the inner peripheral surface of the body and which reenforce the upper axial surface of the filter element.

Still another object of the invention is to provide a simplified method of assembling a filter assembly of a water filtration system without interference from the associated brine seal.

In accordance with another aspect of the invention, this object is achieved by providing a manifold having a tubular boss extending downwardly therefrom, the boss having an internal passage formed therein through which untreated water flows and which terminates in an untreated water inlet port, and by providing 1) a tubular filter element having an outlet communicating with a water discharge port and having an inlet communicating with the inlet port, and 2) a brine seal secured to the filter element, the brine seal including a tubular body having a seal formed on an outer radial periphery thereof. The actual assembly steps include connecting the filter element to the manifold and sealingly engaging the boss with the seal, and then inserting a filter housing over the filter element from below.

Other objects, features, and advantages of the invention will become more readily apparent from the following detailed description and the accompanying drawings. It should be understood, however, that the detailed description and specific examples, while indicating preferred embodiments of the present invention, are given by way of illustration and not of limitation. Many changes and modifications within the scope of the present invention may be made without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout and in which.

DETAILED DESCRIPTION OF THE PREFERRED EMBODIMENTS

Resume

Pursuant to the invention, a filter assembly is provided for a manifolded water filtration system and includes a filter element and a brine seal located at the top of the filter element and engaging a boss depending from the system manifold. The brine seal isolates a rinse water discharge port, communicating with the upper axial surface of the filter element, from an untreated water inlet port formed in the boss so as to ensure that the water to be treated passes through the filter membrane as opposed to directly out of the rinse water discharge port. This configuration eliminates the need for an exterior feed line, thus simplifying the system and preventing vibration during system start-up. The brine seal also structurally reenforces the filter element, facilitates assembly of the filter, and reduces the chances of failure and leakage.

System Overview and Construction of First Brine Seal

Figure 1:
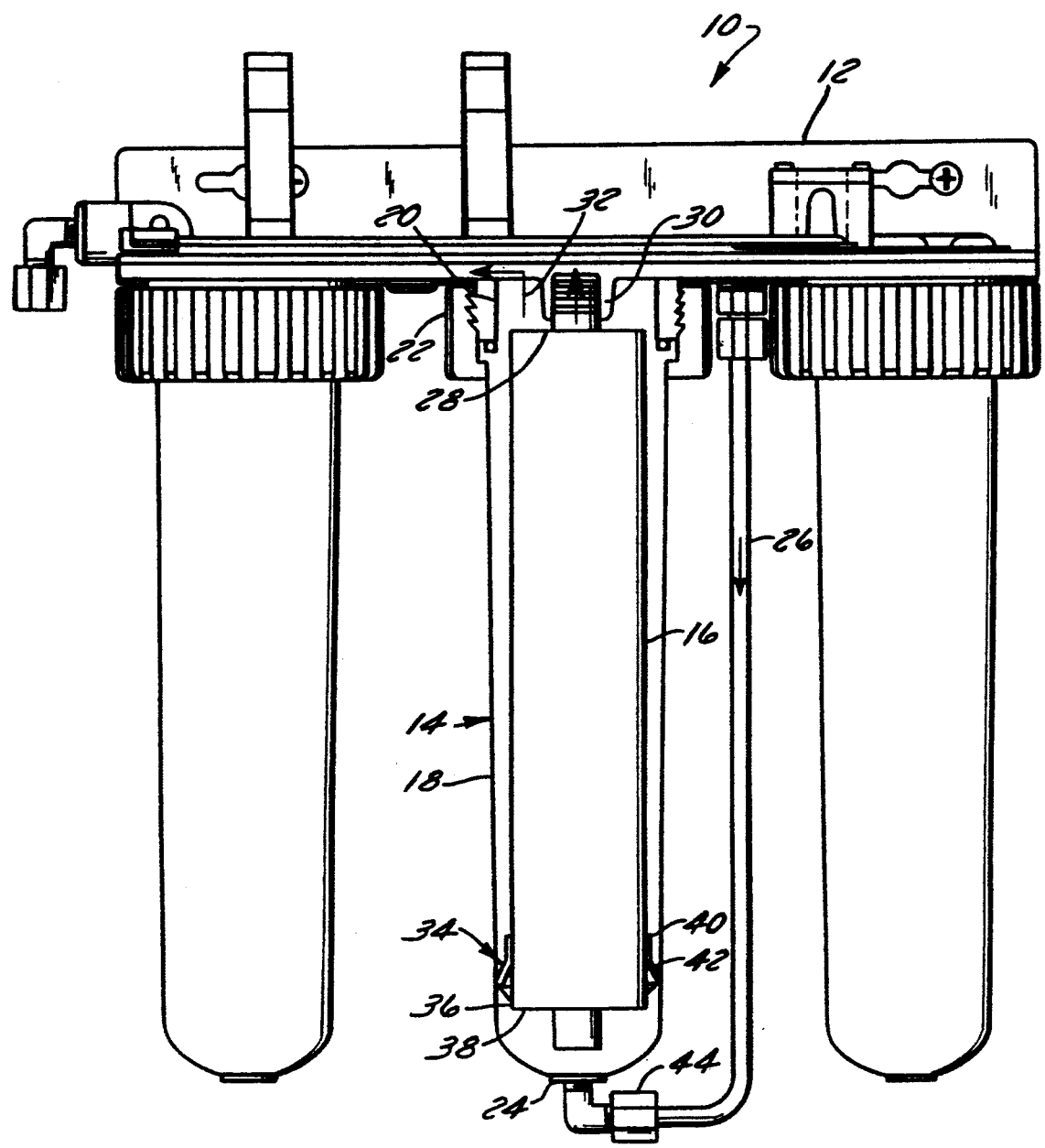
FIG. 1 is a front elevation view, a portion of which is schematically illustrated in cross section, of a water filtration system incorporating a filter element and brine seal constructed in accordance with the prior art, appropriately labeled "Prior Art"
Figure 2:
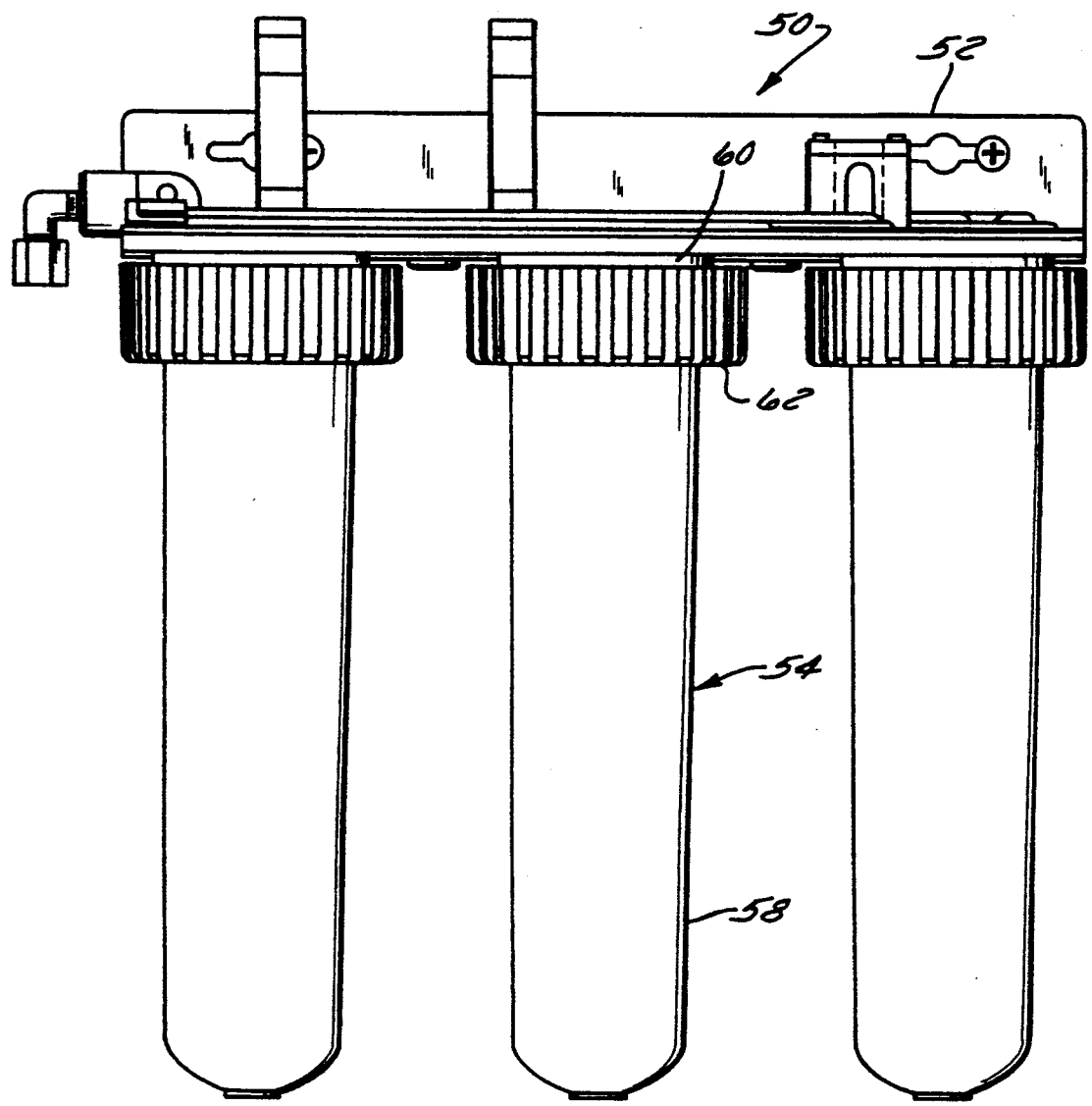
FIG. 2 is a front elevation view of a water filtration system including a filter assembly employing a brine seal constructed in accordance with a first embodiment of the present invention.
Figure 3:
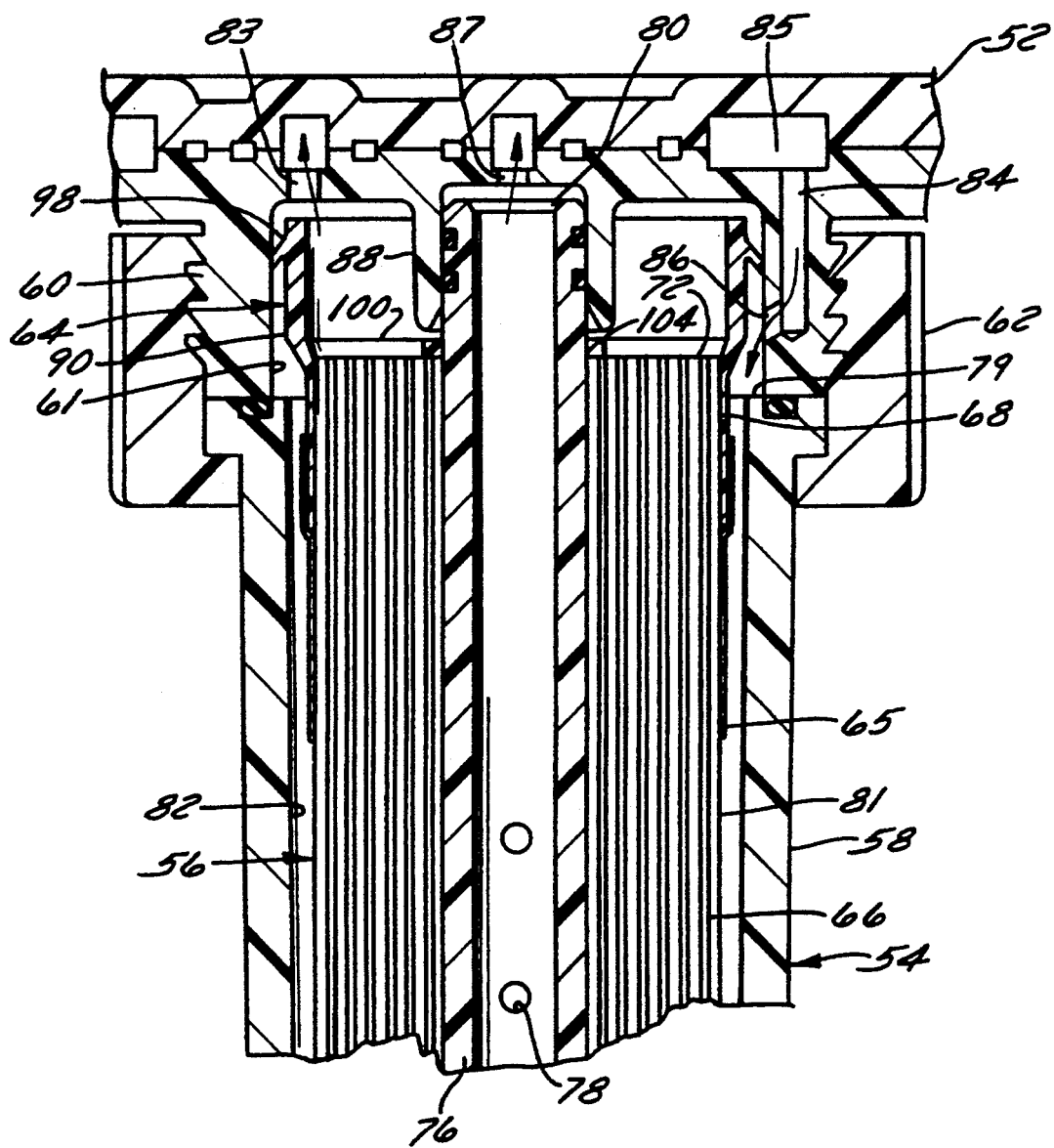
FIG. 3 is a sectional elevation view of a portion of the system of FIG. 2.
Figure 4:
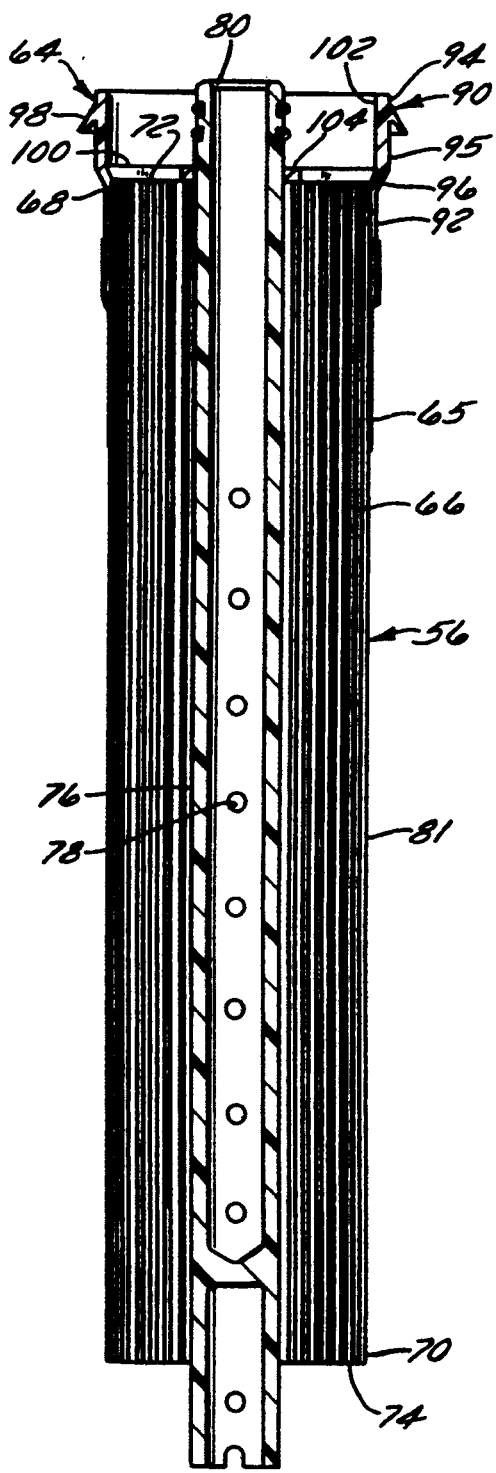
FIG. 4 is a sectional elevation view of the filter element and brine seal of FIGS. 2 and 3.
Figure 6:
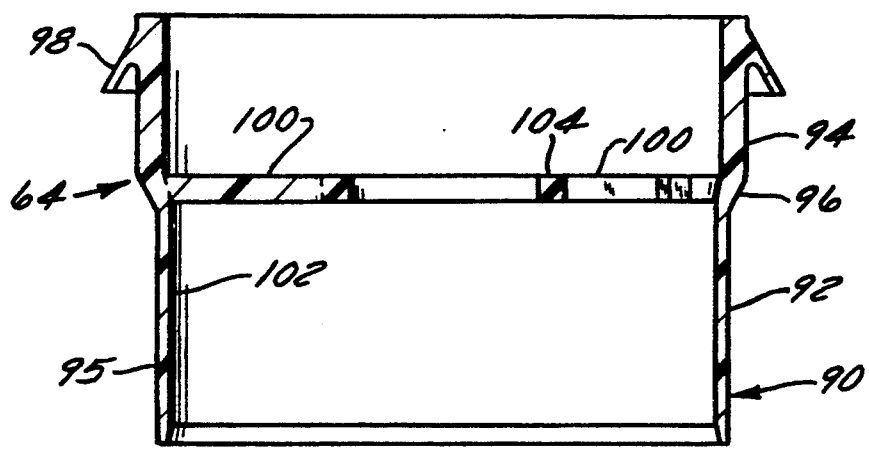
FIG. 6 is a sectional view taken along the lines 6—6 in FIG. 5.
Figure 5:
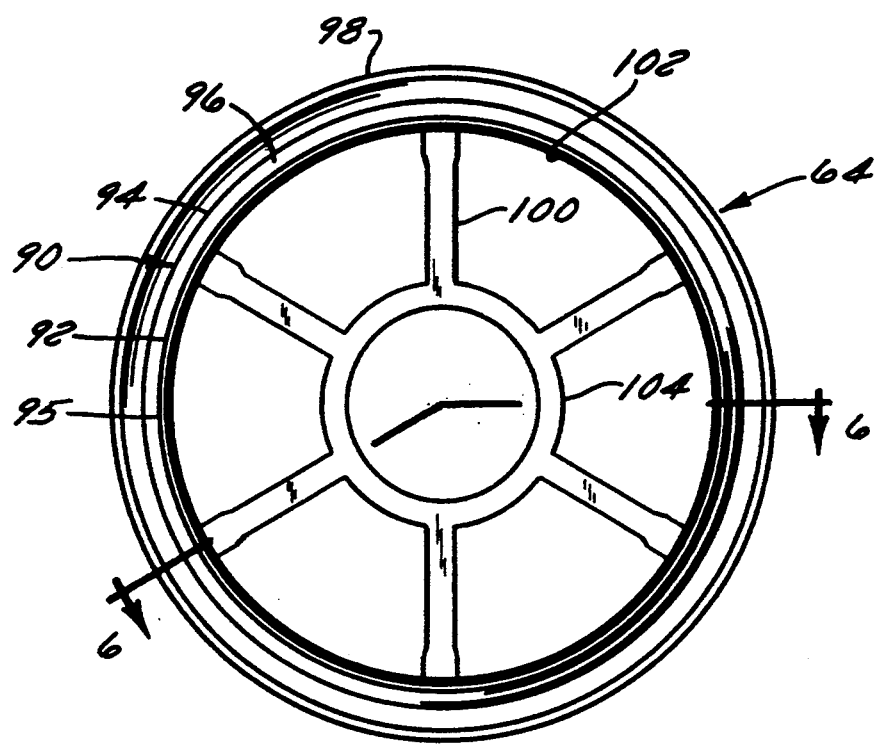
FIG. 5 is an end view of the brine seal of FIG. 4.
Figure 7:
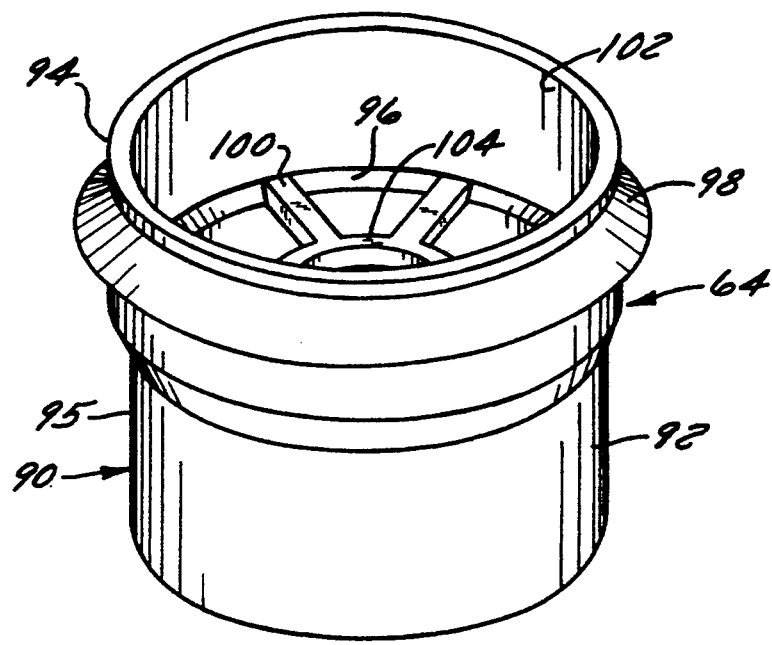
FIG. 7 is a perspective view of the brine seal of FIGS. 3–6.

Referring now to FIGS. 2–7, a drinking water filtration system includes a manifold 52 and a tubular filter assembly 54 constructed in accordance with a preferred embodiment of the invention. Filter assembly 54 includes a filter element 56, a sump or housing 58 encasing the filter element, a tubular support in the form of a boss 60 depending downwardly from the manifold 52, a sump nut 62 sealingly fastening the housing 58 to the boss 60, and a brine seal 64. Brine seal 64 preferably is sealingly mounted on the upper axial end 68 of filter element 56 and sealingly engages the inner peripheral surface 61 of boss 60 in a manner discussed in more detail below.

Several elements such as the filter element 56, boss 60, and body 90 of brine seal 64 are described herein as "tubular." The term "tubular" should not be construed to require a cylindrical or annular element, but should instead be construed to encompass any element which is hollow in its axial direction and has at least one open end. Thus, although all of the "tubular" elements are illustrated and/or described herein as annular or cylindrical, the specification and claims should not be construed as so limiting unless otherwise specified.

Manifold 52 is for the most part identical to that disclosed in the Clack patent discussed above and includes, in the vicinity of filter assembly 54, a feed port 85 for untreated water and discharge ports 83 and 87 for rinse water and treated water. It should be understood, however, that manifold 52 need not take the form illustrated and, in fact, could take the form of a simple support for filter assembly 54, so long as it incorporates a support such as boss 60 and is capable of controlling the flow of water into and out of the filter assembly 54. Moreover, depending upon the configuration of the filter element 56, the locations of discharge ports 83 and 87 could be reversed, in which case brine seal 64 would isolate inlet port 86 from treated water discharge port 87.

Filter element 56 is preferably a so-called reverse-osmosis filter having a tubular, rolled filter membrane 66 (see FIGS. 3 and 4), but could be any tubular filter element such as a nano-filter, micro-filter, or ultra-filter for treating water or any other liquid. Filter element 56 has upper and lower axial ends 68 and 70 terminating in respective open surfaces 72 and 74 forming a filter outlet and a filter inlet, respectively. The radial periphery 81 of filter element 56 is sealed, e.g., by wrapping it with a waterproof wrap. Extending axially through membrane 66 is a treated water collection and transfer tube 76 having a plurality of radial bores 78 formed through the cylindrical wall thereof and terminating at its upper end in a fitting 80 extending beyond the upper surface 72 of filter element 56 for the discharge of treated water.

In use, untreated water is diverted downwardly along the outer periphery 81 of filter element 56 by the brine seal 64 in a manner discussed in more detail below, enters the membrane 66 through the open lower axial surface 74 of filter element 56, and is treated in a manner which is, per se, well known. Treated water enters the tube 76 via the bores 78 and is discharged from the element 56 by the fitting 80 and the discharge port 87. The remaining untreated or rinse water is discharged from the upper open surface 72 of filter element 56 and flows through discharge port 83 formed in manifold 52. Filter element 56 as thus far described is, per se, known and, accordingly, will not be discussed in greater detail.

Housing 58 which is formed, e.g., from injection molded plastic, has an open upper surface 79 but is otherwise completely sealed. Housing 58 is secured and sealed in position by the sump nut 62 which, in the illustrated embodiment, has internal threads engaging mating external threads formed on the boss 60.

Boss 60 is preferably formed integral with manifold 52 and has a passage 84 (FIG. 3) formed therein for untreated water. Passage 84 communicates with feed port 85 formed in manifold 52 and terminates in an untreated water inlet port 86 emptying into the space formed between the outer peripheral surface 81 of filter element 56 and the inner peripheral surface 61 of boss 60 beneath the sealing portion formed by the skirt 98 of brine seal 64. A fitting 88 also depends from the bottom surface of manifold 52 and mates with the corresponding fitting 80 of filter element 56.

Brine seal 64 coacts with boss 60 so as to eliminate the need for a feed line while permitting the use of a conventional filter element 56 having its untreated water inlet in the bottom end 70. Brine seal 64 may be formed from any flexible element such as molded low density polyethylene. Referring to FIGS. 4–7, brine seal 64 preferably includes a tubular body 90 having a lower portion 92 surrounding the upper end 68 of filter element 56 and sealingly secured to the filter element, e.g., by tape 65. Body 90 further includes an upper portion 94 formed integral with the lower portion 92 and extending above the upper axial surface 72 of filter element 56. A skirt 98 projects outwardly and downwardly from an outer periphery 95 of body 90 and forms the seal. Body 90 is stepped outwardly at a junction 96 between the upper and lower portions 94 and 92 such that downwardly angled skirt 98 sealingly engages the inner peripheral surface 61 of boss 60 at a level above inlet port 86.

It can thus be seen that brine seal 64, being located on the upper axial end 68 of filter element 56, eliminates the need for the feed line of the prior art device and, accordingly, eliminates the problems associated with such a feed line. Also, locating the seal 64 in the illustrated position eliminates the need to decrease the diameter of the filter element 56, thus increasing the capacity of the filter assembly 54.

Preferably, provision is made for reenforcing upper axial surface 72 of filter element 56. Without such reinforcements, there is a danger that surface 72 would "telescope" or distort axially under the imposition of forces caused by the water pressure within the membrane 66. In the past, such reinforcements were provided independently of the brine seal. However, pursuant to the invention, such reinforcements are formed integral with the brine seal 64 and take the form of ribs 100 extending radially from the inner peripheral surface 102 of body 90 to an internal annular ring 104, the bottom surface of which is generally coplanar with those of the ribs. Ribs 100 and ring 104 are formed at or proximate the junction 96 such that, when brine seal 64 is secured to the filter element 56, ring 104 engages the fitting 80 and the bottom surfaces of the ring and the ribs 100 rest on the upper axial surface 72 of the filter element 56. Ring 104 may also abut fitting 88 to further inhibit telescoping of the membrane 66. Ribs 100 and ring 104 also perform a secondary function of positioning filter element 56 during assembly.

Assembly and Operation of Filter Assembly Incorporating First Brine Seal

Filter assembly 54 can be connected to the manifold 52 easily and with little fear of error. First, the installer positions the filter element 56 beneath the manifold 52 and inserts the upper end 68 of filter element 56 into the annular boss 60 such that fitting 80 is received in fitting 88 and such that skirt 98 of brine seal 64 sealingly engages the inner peripheral surface 61 of boss 60 at a location above inlet port 86. Because skirt 98 contacts boss 60 through only a relatively short stroke, there is little danger of unwanted "bending over" of skirt 98. Skirt 98, fitting 80, and ring 104 provide sufficient connection forces at this time to retain the filter element 56 in position pending completion of the assembly operation.

Next, the installer simply inserts the housing 58 over the filter element 56 from below until the upper periphery of the housing 58 engages the bottom surface of the boss 60. This operation is simplified due to the fact that there is no interference between the housing 58 and the brine seal 64 and thus no resistance to movement of the housing and no danger of unwanted deflection of the skirt 98 of the brine seal 64.

Finally, sump nut 62 is inserted from below and threaded onto the boss 60 to sealingly fasten the housing 58 to the manifold 52.

After assembly, filter assembly 54 is operated simply by feeding untreated water into the assembly through passage 84 and its associated inlet port 86. Untreated water, deflected by brine seal 64, flows between the outer periphery 81 of filter element 56 and the inner periphery 82 of housing 58, where it applies pressure tending to increase the sealing force on brine seal 64 by holding the tape 65 in place rather than forcing it away from the filter element 56 due to the configuration and location of the brine seal 64. The untreated water flows into the inlet formed by the lower axial surface 74 of filter element 56, and is then treated in membrane 66 as discussed above. Treated water flows out of the assembly 54 through fittings 80 and 88 and out of the discharge port 87, and rinse water flows out of outlet formed by the upper axial surface 72 of filter element 56, through the spaces formed between the ribs 100, and is discharged through discharge port 83. Axial distortion or telescoping of the membrane 66 is prevented or at least inhibited by the ribs 100 and the ring 104.

Structure of Second Embodiment of Brine Seal

Figure 9:
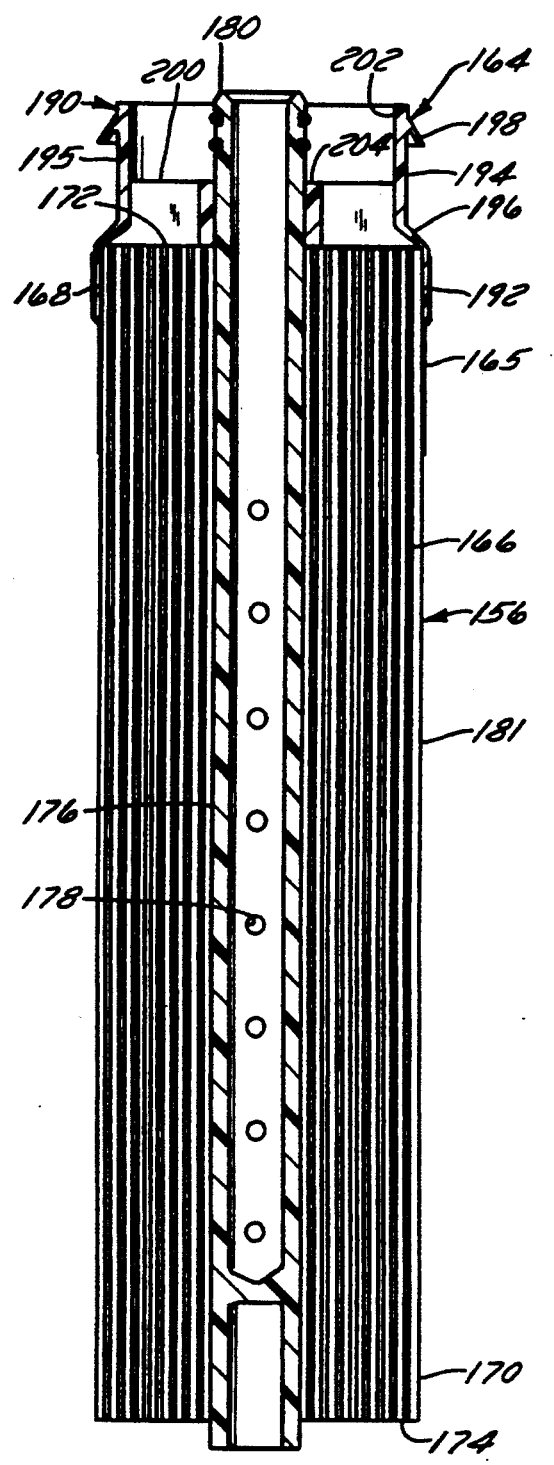
FIG. 9 is a sectional elevation view of the filter element and brine seal of FIG. 8.
Figure 12:
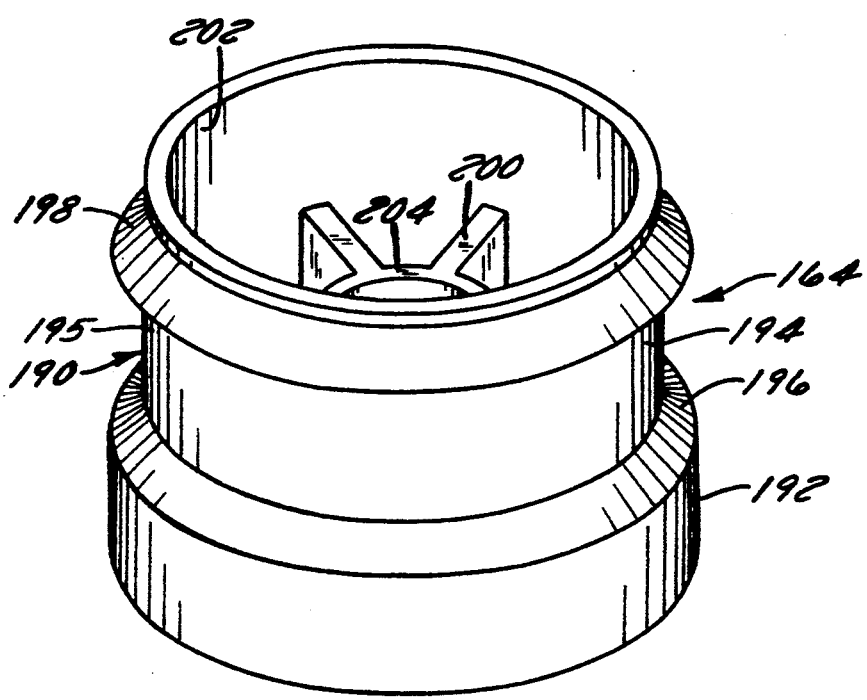
FIG. 12 is a perspective view of the brine seal of FIGS. 8–11.
Figure 8:
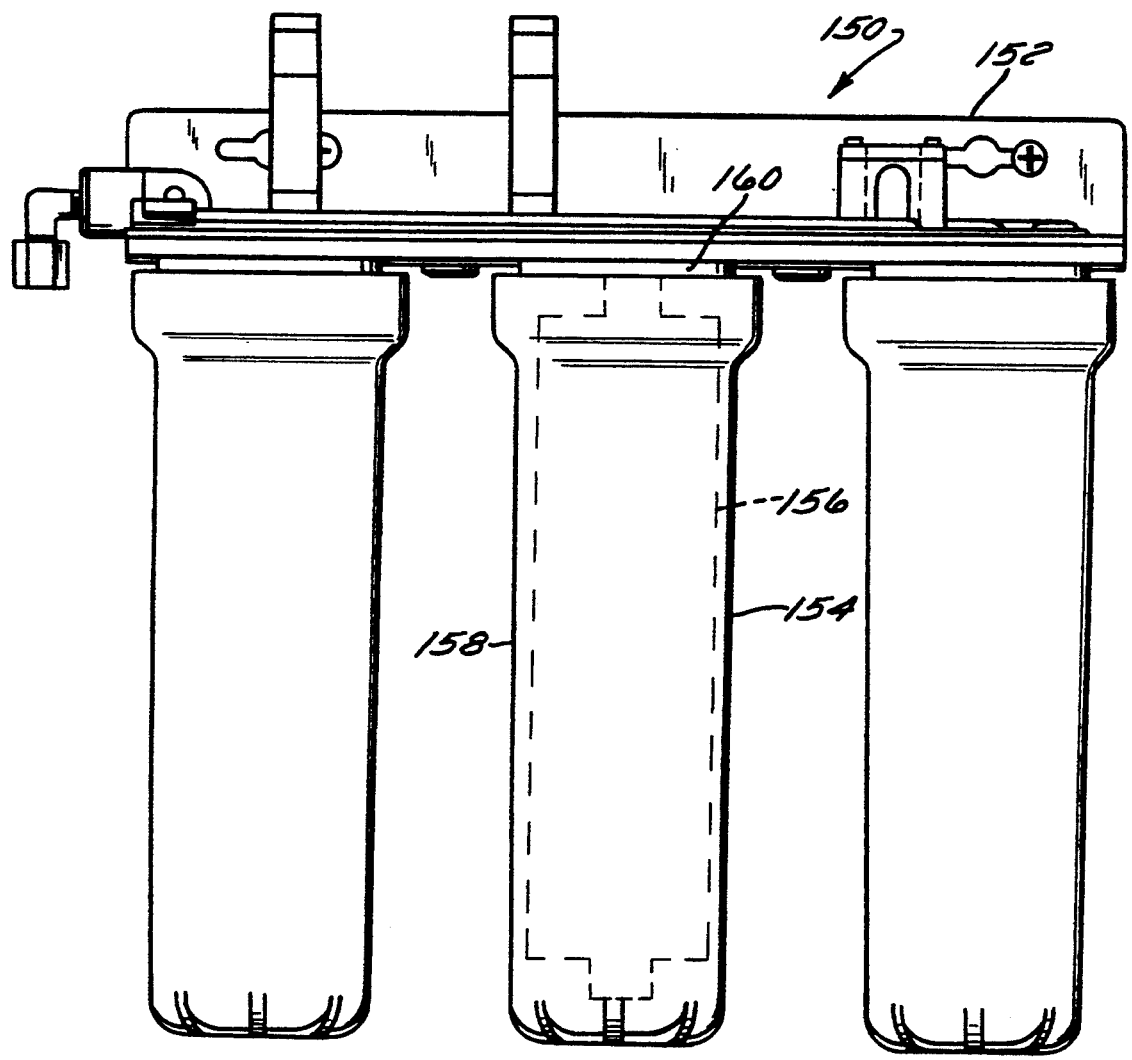
FIG. 8 is a front elevation view of a water filtration system incorporating a filter assembly employing a brine seal constructed in accordance with a second embodiment of the present invention.
Figure 11:
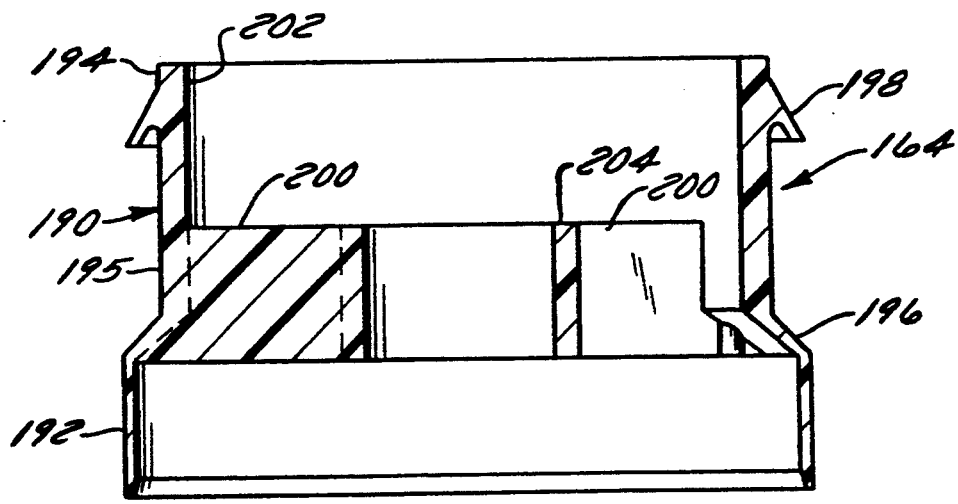
FIG. 11 is a sectional view taken along the lines 11—11 in FIG. 10.
Figure 10:
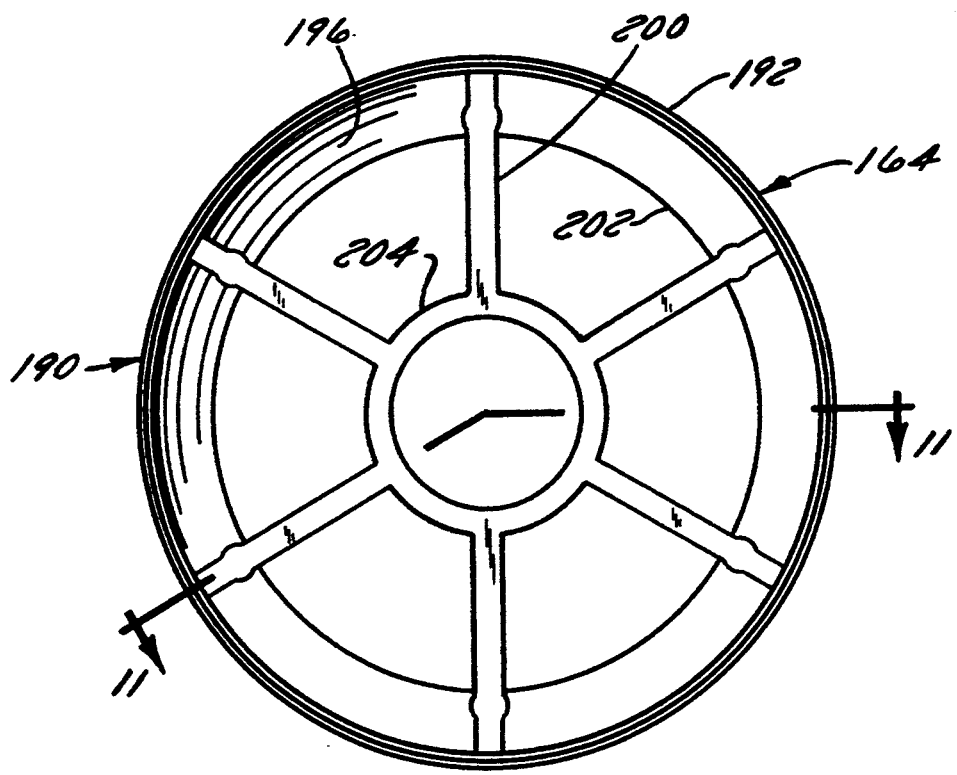
FIG. 10 is an end view of the brine seal of FIG. 9.

The brine seal discussed above is designed for use with a relatively small water filtration system having a capacity of, e.g., 25 gallons per day. Certain modifications may be required when the brine seal is to be used on filter elements of water filtration systems having greater capacities not only because the filter elements are larger, but also because the dangers of telescoping of such elements are higher. The number and degree of such changes will become apparent from the following description of water filtration system 150 which is illustrated in FIGS. 8–12 and which has a capacity of, e.g., 50 gallons per day.

Water filtration system 150 and the associated filter element 156 and brine seal 164 contain essentially the same structural components and are functionally identical to system 50 including the filter element 56 and brine seal 64 illustrated in FIGS. 2–7. Accordingly, the elements in FIGS. 8–12 corresponding to those in FIGS. 2–7 have been given the same reference numerals—increased by 100.

Drinking water filtration system 150 includes a manifold 152 supporting a filter assembly 154. Filter assembly 154 includes a filter element 156 encased by a housing 158 which is connected to a boss 160. A brine seal 164 seals the filter element 156 to the boss 160. In the illustrated embodiment, the housing 158 is formed with an enlarged upper end 179 having internal threads meshing with mating external threads on boss 160, thus eliminating the need for a sump nut. Such an internally threaded housing could also be used in place of the housing 58 of the first embodiment, thus eliminating the need for sump nut 62.

Filter element 156 includes a rolled filter membrane 166 and has an outer peripheral surface 181 and upper and lower ends 168 and 170 terminating in corresponding axial surfaces 172 and 174. A central tube 176 extends through the membrane 166, has radial bores 178 formed therein, and terminates in a fitting 180 for the discharge of treated water.

Brine seal 164 likewise incorporates all of the same components as the brine seal 64. Seal 164 thus has a tubular body 190 having lower and upper portions 192 and 194 joined at a junction 196, and a skirt 198 angled downwardly from an outer periphery 195 of body 190. Lower portion 192 is secured to the filter element 156 by tape 165, and upper portion 194 extends above the upper axial end 168 of the filter element. Radial ribs 200 extend radially inwardly from an inner peripheral surface 202 of body 190 and terminate at an internal ring 204. However, because the membrane 166 is wider than the corresponding membrane 66, lower portion 192 of body 190 must be stepped outwardly rather than inwardly at junction 196 to accommodate the increased diameter of filter element 156. In addition, because there is a greater danger of distortion of the thicker membrane 166, ribs 200 and ring 204 are made deeper so as to provide increased reenforcement. The structure and operation of the filter assembly of FIGS. 8–12 is otherwise identical to that of FIGS. 2–7 and, accordingly, will not be discussed in greater detail.

Other changes and modifications which could be made to the present invention without departing from the spirit and scope thereof will become more readily apparent from a reading of the appended claims.

I claim:

1. A brine seal for isolating a water outlet of a filter assembly from an untreated water inlet, said brine seal being mountable on a tubular filter element of said filter assembly which has an upper axial surface and a fitting extending axially from said upper axial surface, said brine seal comprising:
   A. a tubular body for surrounding said filter element, said body having
      1. inner and outer peripheral surfaces,
      2. a lower portion for mounting said brine seal on said filter element,
      3. an upper portion for extending above said filter element;
   B. a skirt, extending outwardly from said outer peripheral surface of said body, for sealing said untreated water inlet of said filter assembly from said water outlet;
   C. a ring, disposed within said body proximate a junction between said upper and lower portions, for engaging said fitting of said filter element proximate said axial surface; and
   D. a support, extending generally radially from said ring to said inner peripheral surface of said body, for reenforcing said axial surface.

2. A brine seal as defined in claim 1, wherein said support is formed from a plurality of ribs extending radially from said inner peripheral surface of said body to said ring and each having a bottom surface which is generally coplanar with a bottom surface of said ring.

3. A brine seal as defined in claim 1, wherein said body is stepped at said junction.

4. A brine seal as defined in claim 3, wherein said upper portion of said body has a greater diameter than said lower portion.

5. A brine seal as defined in claim 3, wherein said lower portion of said body has a diameter which is no smaller than that of said upper portion, and wherein said ribs and said ring are deepened to provide increased support.

6. A brine seal as defined in claim 1, wherein said ring and said skirt are annular.

7. A brine seal as defined in claim 6, wherein said skirt is formed from a flexible material and is angled downwardly with respect to said outer peripheral surface of said body.

8. A liquid filtration system comprising:

A. a manifold having a water inlet port and a water discharge port formed therein;

B. a tubular support extending from said manifold, said support having a passage formed therein which extends internally through said support to said water inlet port of said manifold, through which untreated water flows, and which terminates in an untreated water inlet port formed in an inner radial peripheral surface of said support;

C. a tubular filter element having an outlet communicating with said discharge port and having in inlet communicating with said untreated water inlet port of said support; and D. a brine seal which is sealingly mounted on said filter element and which sealingly engages said inner peripheral surface of said support between said untreated water inlet port and said outlet to isolate said untreated water inlet port from said discharge port.

9. A filtration system as defined in claim 8, wherein said support comprises an annular boss, and further comprising a filter housing which is mounted on said boss and which is sealed except at an upper axial end thereof.

10. A filtration system as defined in claim 8, wherein said brine seal comprises a tubular body having an inner peripheral surface sealingly mounted on said filter element and having an outer peripheral surface, said brine seal further comprising a skirt which extends from said outer peripheral surface to said support to isolate said inlet port from said discharge port.

11. A filtration system as defined in claim 10, wherein said filter element has a treated water discharge fitting extending from an upper axial surface thereof, and wherein said brine seal further includes
   a ring which engages said fitting, and
   a plurality of ribs which extend radially from said ring to said inner peripheral surface of said body and which reenforce said upper axial surface of said filter element.

12. A filtration system as defined in claim 10, wherein said skirt is angled downwardly from an upper portion of said body.

13. A filtration system as defined in claim 10, wherein said body includes a lower portion which is sealingly secured to said filter element and an upper portion extending above an upper axial surface of said filter element and on which is formed said skirt.

14. A filtration system as defined in claim 10, wherein said inlet of said filter element comprises an open lower axial surface, and said outlet comprises an open upper surface out of which rinse water flows.

15. A water filtration system comprising:
   A. a manifold having a rinse water discharge port formed therein;
   B. an annular boss extending downwardly from said manifold, said boss having outer peripheral threads and an internal passage formed therein through which untreated water flows and which terminates in an untreated water inlet port;
   C. an annular filter element having an upper end surrounded by said boss, communicating with said discharge port, and terminating in an upper axial surface;
   D. an annular fitting extending upwardly from said upper axial surface of said filter element;
   E. a filter housing which encases said filter element and which is enclosed except for an open upper axial surface;
   F. an internally threaded sump nut which fastens said filter housing to said boss; and
   G. a brine seal which isolates said inlet port from said rinse water discharge port, said brine seal including
      (1) a annular body having an inner peripheral surface which surrounds said upper axial end of said filter element and which has an outer peripheral surface, said annular body having a lower portion sealingly secured to said filter element and an upper portion extending above said upper axial surface of said filter element,
      (2) a ring which engages said annular fitting,
      (3) a plurality of ribs which extend radially from said ring to said inner peripheral surface of said annular body proximate a junction between said upper and lower portions thereof, said ribs engaging said upper axial surface of said filter element, and
      (4) a skirt which extends outwardly from said outer peripheral surface of said annular body proximate an upper end of said upper portion, which is angled downwardly, and which sealingly engages said boss.

16. A method of assembling a water filtration system comprising:
   A. providing a manifold having a tubular support extending downwardly therefrom, said support having an internal passage formed therein through which untreated water flows and which terminates in an inner radial peripheral water inlet port;
   B. providing a tubular filter assembly including
      (1) a tubular filter element having an outlet communicating with a discharge port formed in said manifold and having an inlet communicating with said inlet port, and
      (2) a brine seal sealingly mounted on said filter element; then
   C. connecting said filter element to said manifold and sealingly engaging said support with said brine seal at a location above said inlet port; and then
   D. inserting a filter housing over said filter element from below.

17. A method as defined in claim 16, wherein said step of providing a filter element further includes providing a fitting extending upwardly from an upper axial surface of said filter element, and said step of providing a brine seal includes providing a brine seal having
   (a) an internal ring which engages said fitting, and
   (b) a plurality of ribs which extend radially from said internal ring and which reenforce said upper axial surface of said filter element.

18. A liquid filtration system comprising:
   A. a manifold having a water discharge port formed therein;
   B. a tubular support extending from said manifold, said support having an internal passage formed therein through which untreated water flows and which terminates in an untreated water inlet port formed in an inner radial peripheral surface thereof;
   C. a tubular filter element having a first axial end defining an outlet communicating with said discharge port and having a second axial end defining an inlet communicating with said inlet port;
   D. a brine seal comprising 1. a tubular body having
    a. a first portion mounted on said filter element proximate said first axial end, and
    b. a second portion extending axially beyond said first axial end of said filter element, said brine seal further comprising
2. a skirt which extends from an outer peripheral surface of said body to said support to isolate said inlet port from said discharge port; and
E. a filter housing which is mounted on said tubular support and which is sealed except at an axial end there of located adjacent said first axial end of said filter element.

19. A liquid filtration system comprising:
A. a manifold having a water inlet port, a rinse water discharge port, and a treated water discharge port formed therein;
B. a tubular support extending from said manifold, said support having a passage formed therein which extends internally through said support to said water inlet port of said manifold, through which untreated water flows, and which terminates in an untreated water inlet port formed in an inner radial peripheral surface of said support;
C. a tubular filter element having
    (1) first and second outlets formed in a first axial end thereof and communicating with said rinse water discharge port and said treated water discharge port, respectively, and
    (2) an inlet formed in a second axial end thereof and communicating with said untreated water inlet port of said support; and
D. a brine seal which is sealingly mounted on said filter element and which sealingly engages said inner peripheral surface of said support between said first axial end of said filter element and said untreated water inlet port to isolate said untreated water inlet port from said rinse water discharge port.

20. A method of treating water comprising:
A. providing a filtration system comprising a manifold, a support extending from said manifold, a tubular filter element extending from said support and having an axial outlet surrounded by said support and an axial inlet remote from said support, and a housing encasing said filter element with a space formed therebetween;
B. feeding untreated water through an internal passage formed in said support, out of an untreated water inlet port formed in an inner radial peripheral surface of said support, and into said space between said housing and said filter element; then
C. directing said untreated water toward and into said inlet of said filter element while preventing said untreated water from flowing to said outlet; and then
D. treating said untreated water in said filter element.

* * * * *